United States Patent Office 3,096,226
Patented July 2, 1963

3,096,226
AQUEOUS COMPOSITION OF PHENOL-ALDEHYDE CONDENSATE AND METHOD OF BONDING MATERIALS WITH SAME
Clarence W. Spilker, Hopewell, Va., assignor to Allied Chemical Corporation, New York, N.Y., a corporation of New York
No Drawing. Filed Feb. 23, 1961, Ser. No. 90,908
2 Claims. (Cl. 156—335)

This invention relates to novel, non-resinous, phenolic bonding compositions which resinify and cure in situ, and also to the process of preparing the same and to the method of bonding using such compositions, as in the manufacture of plywood.

The utility of phenol-formaldehyde compositions in the bonding of a wide range of various materials has been long known. Manufacture of such bonding compositions has involved, in the customary situation, the reaction of phenol and formaldehyde as separately produced raw materials to form a resinous product which may be packaged as a dry resin but which is generally sold in liquid form. This resinous product, as required, is charged to a suitable mixing pot by the ultimate user who prepares the final bonding composition in a procedure involving the addition of ingredients which may include water, catalyst, curing agents, accelerators, etc. and the application of heat to impart sufficient fluidity to work the composition to and from the spreaders or applicators. The fluid, catalyzed resin formulation is relatively unstable and the term "pot life" is used to designate the period of time during which this final formulation retains a workable viscosity. A pot life of about 8 hours, preferably 10–12 hours, is considered necessary.

Until recently one problem in the industry was the increased cost represented by transporting the large amounts of water contained in formaldehyde solutions, e.g. formalin, which are the usual source of formaldehyde used by the phenolic resin manufacturer. The art has developed concentrate solutions having relatively low water content and containing large total amounts of free and combined formaldehyde and which represent a convenient and economical method of shipping this raw material.

The practice in the past has been to employ phenolic bonding compositions which are already resinous when used. That is, when preparing the phenol-formaldehyde bonding composition, whether the starting materials include phenol and formaldehyde or a concentrate solution, it has been considered necessary that the resin manufacturer cook the materials and advance the reaction to the resinous stage. Examples of such procedures are U.S. Patents 2,620,321 and 2,457,493. In all cases, the production of phenolic resins is a highly-developed manufacturing procedure requiring considerable expenditure of time, specialized equipment and processing technique representing capital investment and operating charges, all of which are a significant part of the cost of such products which can be economically produced only in large quantities. The ultimate user must pay this higher cost than would be required if resin formation was not necessary and, in addition, must maintain suitable mixing equipment and storage facilities for preparation of the final working composition although total consumption is insufficiently high to make resin manufacture an economical venture.

Non-resinous bonding compositions were not commercially employed, primarily for the reason that such compositions have not been considered satisfactory for the purpose. This is reflected in U.S. Patent 2,397,018 to Kroeger and O'Connor describing the preparation of a non-resinous composition in a procedure requiring the removal of all potentially-reactive free formaldehyde by the addition of sodium bisulfite. In addition, it will further be apparent that any non-resinous bonding composition must be competitive with resinous compositions from the standpoint of pot life, bond strength, waterproof properties, etc.

An object of the present invention is to provide a new and improved bonding composition from phenol and formaldehyde prepared by a process which eliminates the necessity of resinifying these reactants. Another object is to provide a non-resinous phenol-formaldehyde bonding composition which resinifies and cures in situ to form a strong, waterproof bond. Another object is to provide a non-resinous phenol-formaldehyde bonding composition having good pot life and workability. Another object is to provide an efficient, economical method of preparing a non-resinous phenol-formaldehyde bonding composition. A further object is to provide a method of easily preparing a non-resinous phenol-formaldehyde bonding composition from stable, storable materials. A still further object is to provide methods of bonding using new and improved non-resinous phenol-formaldehyde compositions, as in the manufacture of plywood.

In accordance with the present invention, these and other objects and advantages are accomplished by a liquid non-resinous phenol-formaldehyde bonding composition comprising an aqueous alkaline mixture in definite proportions of low molecular weight non-resinous phenol and formaldehyde condensation products, free phenol, free formaldehyde and water. Specifically, the bonding composition of the present invention comprises the mixture within the range of about pH 8 to pH 11.5, preferably at pH 9–pH 10.5 of 40 to 70 parts, preferably 45 to 65 parts by weight, of a non-resinous phenol-formaldehyde condensation product having an average molecular weight within the range of about 124 to 316, preferably an average molecular weight of 154 to 184; 15 to 45 parts, preferably 16 to 40 parts by weight free formaldehyde; 20 to 65 parts, preferably 24 to 55 parts by weight free phenol; and 10 to 160 parts, preferably 12 to 150 parts water. In order to obtain good bonding it has been found necessary that the ratio of free formaldehyde to free phenol be within the range of about 1.8 mols to 2.5 mols, preferably 2.1 mols to 2.3 mols of free formaldehyde per mol of free phenol. The pH is maintained above about pH 8 by the presence of alkaline material, preferably sodium hydroxide or potassium hydroxide. A pH below pH 8 is undesirable because extended cure times would be required for bonding. In the preferred composition a small amount of sodium carbonate or potassium carbonate, about 0.02 to 0.2 mol per mol of total phenol, is incorporated in the mixture as it was found to reduce the cure time as much as one half the time otherwise required. As conventional in the art, the composition may also contain extenders, fillers, etc. as desired.

In the present invention the condensation reaction is controlled to produce low molecular weight compounds which are not resins. Thus, the portion of the bonding composition representing the condensation product contains phenol and formaldehyde condensed predominantly in the form of monomethylol, dimethylol and trimethylol phenols and polymethylol diphenols, with no more than about 4 percent, usually 2 percent, more generally no more than 1 percent, of condensation products having a molecular weight greater than 320. Examples of specific compounds are 2,4-dimethylolphenol, sym-trimethylolphenol, o- and p-methylolphenol, 2,6-dimethylolphenol and 3,3',5,5' - tetramethylol - 4,4' - dihydroxydiphenylmethane. Depending upon the selection of specific conditions for preparation the condensation product will contain varying proportions of these compounds. The presence of any one compound or type or group of such compounds is not important so long as that portion representing phenol-formaldehyde condensation product has an average molecular weight of within the range of 124 to 316, preferably an average molecular weight of 154 to 184, as employed in the present invention.

The bonding composition of the present invention is a clear, yellow-colored liquid having a stable water dilutability (at pH 8) of about 5 to 10 ml. of water per ml. of composition. The composition is a mobile fluid and will flow by gravity or may be pumped, sprayed, spread or brushed at room temperature and even higher. To avoid resinification the bonding composition should desirably be maintained at low temperature, generally below 50° C. prior to ultimate use. Above about 50° C. the composition is particularly unstable and gels rapidly with the formation of a resinous material which cannot be employed in customary bonding methods. Elevated pot temperatures are not required and the composition may be worked at room temperature with a pot life of at least about 12 hours. The composition is miscible in organic solvents such as methanol, ethanol, acetone, and the like which may be substituted in part for the aqueous component of the composition as desired or required depending upon the purpose for which it will be used. The bonding composition of the present invention resinifies and cures in situ, has excellent waterproof properties and forms a strong bond as exemplified by high percentage of wood failure before bond failure when tested as an adhesive in the manufacture of plywood.

One method of preparation of the bonding composition of the present invention involves forming an aqueous solution containing non-resinous low molecular weight condensation products by reacting phenol with a molar excess of formaldehyde, about 4 to 7 mols of formaldehyde per mol of phenol, under alkaline conditions, preferably at pH 8 to pH 9, and arresting the reaction when the phenol-formaldehyde condensation product has an average molecular weight within the range of 124–316, preferably an average molecular weight of 154 to 184, providing sufficient water, formaldehyde and phenol to give a composition containing 40 to 70 parts, preferably 45 to 65 parts by weight non-resinous phenol-formaldehyde condensation product having an average molecular weight within the range of 124 to 316, preferably an average molecular weight of 154 to 184; 15 to 45 parts, preferably 16 to 40 parts by weight free formaldehyde; 20 to 65 parts, preferably 24 to 55 parts by weight free phenol; and 10 to 160 parts, preferably 12 to 150 parts by weight water, the ratio of free formaldehyde to free phenol being within the range of about 1.8 mols to 2.5 mols, preferably 2.1 mols to 2.3 mols of free formaldehyde per mol of free phenol, and adjusting the resulting composition to within the range of about pH 8 to pH 11.5, preferably pH 9 to pH 10.5. Extenders and activators may be conveniently added as desired.

Reaction to form the non-resinous low molecular weight condensation products is desirably carried out at a temperature within the range of about 60–100° C. At temperatures below about 60° C. the reaction is impractically slow and the product less satisfactory. At temperatures appreciably above 100° C. the reaction is difficult to control. Depending upon the ratio of formaldehyde to phenol employed in the condensation reaction the resulting solution containing non-resinous condensation products may contain free phenol and free formaldehyde which are taken into account in providing the required amounts of these constituents. High ratios result in larger amounts of free formaldehyde which in some cases may be adequate to supply the required free formaldehyde content of the final composition. Formaldehyde may be utilized as a 30–45 weight percent aqueous solution, i.e. commercial formalin. Excess water may be removed by vaporization to provide a more concentrated composition. Reaction time to form non- resinous condensation products of the required molecular weight will vary depending on temperature and pH of the reaction mixture. Lower temperatures and pH values result in longer reaction times which may be as much as 10 to 30 hours. High reaction rates are achieved at higher temperatures and pH values. Under preferred reaction conditions at temperatures about 90° C. at pH 8–pH 9, the reaction may be completed in about 0.5 to 1 hour.

In the preferred method of preparation phenol and a relatively large excess of formaldehyde are heated under alkaline conditions to form an aqueous solution containing low molecular weight condensation products and sufficient free formaldehyde followed by the addition of necessary amounts of free phenol and final adjustment of the pH. In detail, the preferred method involves admixing a 30–45 weight percent aqueous formaldehyde solution, preferably uninhibited, with phenol, preferably phenol having a concentration in excess of about 80 percent by weight, in the molar proportion of about 4–7 mols of formaldehyde for each mol of phenol. The mixture is adjusted to a pH within the range of about 7.0–9.0, and heated to a temperature within the range of 60–100° C., preferably 80–100° C., until the free formaldehyde content of the reaction mixture drops to within the range of about 15–25 percent by weight of the reaction mixture, preferably 18–20 percent free formaldehyde by weight of the reaction mixture. If desired, the reaction mixture may then be concentrated, preferably by subjecting to evaporation at subatmospheric pressure, to increase the solids content to as much as 75–90 percent by weight of the reaction mixture. At this point, when adjusted to a pH within the range of about pH 5–pH 7.5, preferably pH 6–pH 7, the mixture of condensation product and free formaldehyde may be stored for long periods of time without appreciable change in composition or viscosity. Sufficient phenol is then added at a temperature below about 50° C., preferably and conveniently at room temperature to form a composition in the desired proportions and the resulting composition adjusted to within the range of about pH 8 to pH 11.5, preferably pH 9 to pH 10.5.

Adjustment of the pH of the final product is made by the addition of an alkaline material, preferably sodium hydroxide or potassium hydroxide. Examples of other alkaline materials are the hydroxides and oxides of ammonia, barium, calcium, lithium, magnesium, etc. The adjusted alkaline product has a good workability and long pot life and may be withdrawn from the mixer and transferred directly to an applicator for immediate use. When maintained at pH 8 to pH 11.5, preferably at pH 9 to pH 10.5, the composition remains workable at 25° C. for at least about 12 hours, usually about 24 to 36 hours. Stability and storage life may be increased by deferring the addition of the alkaline material and maintaining the composition below about pH 8.

Apparatus used in preparing the bonding composition of the present invention need not be of any specialized type and may be of simple design and construction. Any suitable vessel equipped with mixing means and means for introducing the components and discharging product may be employed.

The preferred composition contains a small amount of an activator. Specific examples of such activators include the inorganic carbonates such as sodium carbonate, potassium carbonate, and ammonium carbonate. The organic amines may also be used, such as ethylene diamine, propylamine, monoethanolamine, diethanolamine, and triethanolamine. Other activators include ammonia. The activator is usually added in minor proportions of about 0.01 to 0.3 mol, preferably 0.02 to 0.2 mol per mol of total phenol. In the preferred method of preparation, about 0.02 to 0.2 mol of sodium carbonate, potassium carbonate, or ethylene diamine is added per mol total phenol. Such addition substantially shortens the cure time which may be reduced to as much as one-half that normally required when the activator is omitted from the formulation.

The composition of the present invention is compatible with conventional extenders such as shell flour, wheat flour, wood flour, asbestos, furafil, etc. which may be added as desired. Depending upon the particular ultimate use various filler materials may also be added including fibrous as well as non-fibrous fillers such as pigments, quartz, aluminum oxide and sand.

The non-resinous composition of the present invention may be employed in the particular instances where resinous phenolic bonding compositions are known to be used. Examples of such uses include the bonding of cellulosic materials as in the manufacture of plywood, wallboard, chip board etc., the preparation of shell moldings, coated abrasives, the bonding of mineral fibers and the impregnating of heavy paper products. Typical bonding procedures of this type involve forming an assembly of the materials to be bonded in which at least one surface in contact with an adjacent surface of the materials in said assembly is coated with the bonding composition, and heating the assembly at elevated temperatures for sufficient time to thermoset the bonding composition to the infusible state. The non-resinous composition of the present invention may be thermoset by resinifying and curing in situ at temperature generally ranging from about 125° C. to 200° C. As desired, pressure may be employed during thermosetting, generally pressures of from 150 p.s.i.g. to 500 p.s.i.g. The time of thermosetting the bonding composition will, of course, vary depending upon temperature and whether pressure is employed and may be as long as 24 to 48 hours or as short a period as 1 to 15 minutes.

The composition of the present invention is particularly useful as an adhesive in the manufacture of plywood, chip board, wall board and other such cellulosic materials where a strong, waterproof bond is required. In these procedures the assembly is heated to a temperature of about 125° C. to 200° C., usually under a pressure of about 150 p.s.i.g. to 500 p.s.i.g., during which the bonding composition resinifies and cures in situ to the infusible state, generally in a period of about 3 to 25 minutes. Typically, in the manufacture of plywood, the method involves forming an assembly of panels to be bonded in which at least one surface in contact with the surface of an adjacent panel in said assembly is coated with the bonding composition of the present invention, and subjecting said assembly to a temperature of 125° C. to 200° C., preferably 135° C. to 160° C., and a pressure of 150 p.s.i.g. to 250 p.s.i.g., preferably 165 p.s.i.g. to 200 p.s.i.g., to thermoset the adhesive composition by resinifying and curing in situ to the infusible state. Time for thermosetting is usually about 2 to 15 minutes, being 3 to 5 minutes under the preferred conditions to form a strong bond having good waterproof properties.

The following examples in which parts are by weight unless otherwise indicated illustrate the practice of the present invention.

EXAMPLE 1

This example demonstrates the preparation of the non-resinous bonding composition of the present invention. At room temperature 641 parts of 88 percent aqueous solution of phenol was mixed with sufficient 20 percent sodium hydroxide solution to increase the pH to about pH 8. To this solution was added 3060 parts 37 percent aqueous formaldehyde, the pH of which has been adjusted to about pH 8 with 20 percent aqueous sodium hydroxide. This reaction mixture was agitated and heated to 80° C. The temperature was maintained at about 80° C. for about 2 hours while maintaining pH 8 by the gradual addition of 20 percent sodium hydroxide solution. After about 2 hours total reaction time the free formaldehyde content of the mixture (as determined by 0° C. sulfite titrations) decreased from 30 to 20 percent. The reaction mixture was then concentrated by evaporation at 50 mm. Hg pressure (abs.) in a steam jacketed long tube evaporator. About 47 weight percent of the charge was taken overhead at 45–50° C. The overhead contained about 1 weight percent phenol and about 4 weight percent formaldehyde. There was withdrawn from the evaporator an aqueous solution of phenol-formaldehyde reaction product containing about 85 percent by weight total solids. The product contained about 37 weight percent phenol, essentially as phenol-formaldehyde condensation product, and about 47.8 weight percent formaldehyde of which about 22.7 weight percent was free formaldehyde. The free phenol content was less than 2 weight percent. The product was not a resin but contained predominantly phenol and formaldehyde condensed to predominantly the mono, di, and trimethylol stage, some polymethylol diphenols, plus free formaldehyde. The viscosity of the product at this point was about 100 centipoises at 25° C. as determined by a Brookfield viscometer. The average molecular weight of that portion of the mixture representing condensation products of phenol and formaldehyde was about 160 as determined by chromatographic and chemical analyses with no more than about 1 weight percent of condensation products having a molecular weight greater than 320.

Non-resinous phenol formaldehyde adhesive composition was prepared using the aqueous mixture of phenol-formaldehyde condensation product and free formaldehyde prepared as above. 150 parts of this mixture having a temperature of 25° C. and pH 7.0 was charged to a stirred pot and mixed with 44 parts of molten phenol having a temperature about 45° C. The mixture was stirred for 5 minutes until homogeneous. The pH of the resulting mixture was adjusted to about pH 9.6 by the addition of about 20 parts 50 percent aqueous sodium hydroxide during which the temperature of the mixture increased from about 30° C. to 45° C. The mixture contained 54.8 weight percent phenol-formaldehyde combined in the form of mono, di, and trimethylol phenol and polymethylol diphenols, 25.5 weight percent free phenol, and 19.7 weight percent free formaldehyde, as based on the total weight of free and combined phenol and formaldehyde. The product at this point was yellow in color with a viscosity of 1100 centipoises at 25° C. as determined by a Brookfield viscometer, and a stable water dilutability of 7 ml. of water per ml. product at 25° C. There was then added to the composition 25 parts of walnut shell flour as extender and 6.7 parts sodium carbonate as activator, the final adhesive composition remaining at about pH 9.6.

EXAMPLE 2

The non-resinous phenol-formaldehyde composition prepared in Example 1 was tested as adhesive for plywood assemblies. The liquid phenol-formaldehyde adhesive product was spread on both faces of plywood core stock, having dimensions of 8 inches by 8 inches by 1/16 inch. Sufficient adhesive was spread to provide 18 grams of adhesive per square foot of core surface. Face and back veneers of 1/16 inch thickness were placed on each core and the plywood assemblies then cured at a pressure of about 175 p.s.i.g. and platen temperature of 150° C. for periods of 5 and 10 minutes. The plywood panels so formed showed a high proportion of wood failure and also excellent shear strength and waterproof properties. Test results are summarized below in Table I.

Table I

| Panel Assembly No. | Cure Temp., °C. | Cure Time, Minutes | Cure Pres., p.s.i. | Wood Failure, percent | Shear Strength,[1] p.s.i. Dry | Shear Strength,[1] p.s.i. Wet |
|---|---|---|---|---|---|---|
| 1 | 150 | 5 | ca. 175 | 100 | 300 | 317 |
| 2 | 150 | 10 | ca. 175 | 100 | 271 | 322 |

[1] The wet and dry shear strength tests were carried out in accordance with U.S. Department of Commerce Commercial Standard CS 35–56.

EXAMPLE 3

This example demonstrates utility of an activator in the non-resinous bonding composition of the present invention. Liquid non-resinous phenol-formaldehyde composition was prepared as in Example 1 with sodium carbonate omitted from the adhesive formulation. This composition was spread at a rate of 18 grams per sq. foot on both faces of plywood core stock having dimensions of 8 inches by 8 inches by 1/16 inch and face and back veneers placed on each core. These assemblies were then cured at a pressure of about 175 p.s.i. and at platen temperature of 150° C. for periods of 5 and 10 minutes. Tests conducted on these assemblies showed a high proportion of wood failure for those assemblies cured for 10 minutes, and a relatively low proportion of wood failure for those cured for 5 minutes. Test results are summarized below in Table II.

Table II

| Panel Assembly No. | Cure Temp., °C. | Cure Time, Minutes | Cure Pres., p.s.i. | Wood Failure, percent | Shear Strength,[1] p.s.i. Dry | Shear Strength,[1] p.s.i. Wet |
|---|---|---|---|---|---|---|
| 3 | 150 | 5 | ca. 175 | 28 | 240 | 252 |
| 4 | 150 | 10 | ca. 175 | 84 | 244 | 275 |

[1] The wet and dry shear strength tests were carried out in accordance with U.S. Department of Commerce Commercial Standard CS 35–56.

EXAMPLE 4

This example demonstrates the preparation of the non-resinous bonding composition of the present invention. At room temperature 1655 parts of 88 percent aqueous solution of phenol was mixed with sufficient 20 percent sodium hydroxide solution to increase the pH to about pH 8. To this solution was added 8130 parts 36 percent aqueous formaldehyde, the pH of which had been adjusted to about pH 8 with 20 percent aqueous sodium hydroxide. This reaction mixture was agitated and heated to 80° C. The temperature was maintained at about 80° C. for about 2 hours while maintaining pH 8 by the gradual addition of 20 percent sodium hydroxide solution. After about 2 hours total reaction time the free formaldehyde content of the mixture (as determined by 0° C. sulfite titrations) decreased from 30 to 20 percent. The reaction mixture was then concentrated by evaporation at 50 mm. Hg pressure (abs.) in a steam jacketed long tube evaporator. About 47 weight percent of the charge was taken overhead at 45–50° C. The overhead contained about 1 weight percent phenol and about 4 weight percent formaldehyde. There was withdrawn from the evaporator an aqueous solution of phenol-formaldehyde reaction product containing about 85 percent by weight total solids. The product contained about 33.2 weight percent phenol as phenol-formaldehyde condensation product and about 51.7 weight percent formaldehyde of which about 29.3 weight percent was free formaldehyde. The free phenol content was less than 2 weight percent. The product was not a resin but contained predominantly phenol and formaldehyde condensed to predominantly the mono, di, and trimethylol stage, polymethylol diphenols, plus free formaldehyde. The viscosity of the product at this point was about 90 centipoises at 25° C. as determined by a Brookfield viscometer. The average molecular weight of that portion of the mixture representing condensation products of phenol-formaldehyde was about 162 as determined by chromatographic and chemical analyses, with no more than about 1 weight percent of condensation products having a molecular weight greater than 320.

Non-resinous phenol-formaldehyde adhesive composition was prepared using the aqueous mixture of phenol-formaldehyde condensation product and free formaldehyde prepared as above. 150 parts of this mixture having a temperature of 30° C. and pH 6.5 was charged to a stirred pot and mixed with 58 parts of molten phenol having a temperature about 45° C. The mixture was stirred for 5 minutes until homogeneous. Then 13 parts sodium carbonate was stirred into the mixture. The pH of the resulting mixture was adjusted to about pH 10.4 by the addition of about 42 parts 50 percent aqueous sodium hydroxide during which the temperature of the mixture increased from about 30° C. to 45° C. The mixture contained 45 weight percent phenol-formaldehyde combined in the form of mono, di, and trimethylol phenols and polymethylol diphenols, 31.3 weight percent free phenol, and 23.7 weight percent free formaldehyde, as based on the total weight of free and combine phenol and formaldehyde. The product at this point was yellow in color with a viscosity of 4300 at 25° C. as determined by Brookfield viscometer, and a stable water dilutability of 90 ml. of water per ml. product at 25° C. The composition was diluted with 199 parts of water and there was added 50 parts of walnut shell flour and 13 parts wheat flour as extender, the final adhesive composition remaining at about pH 10.4.

EXAMPLE 5

The non-resinous phenol-formaldehyde composition prepared in Example 4 was tested as adhesive for plywood assemblies. The liquid phenol-formaldehyde adhesive product was spread on both faces of plywood core stock, having dimensions of 8 inches by 8 inches by 1/16 inch. Sufficient adhesive was spread to provide 18 grams of adhesive per square foot of core surface. Face and back veneers of 1/16 inch thickness were placed on each core. About 45 minutes after adhesive was applied the plywood assemblies were cured at a pressure of about 175 p.s.i.g. and platen temperature of 150° C. for periods of 5 and 10 minutes. The plywood panels so formed showed a high proportion of wood failure and also excellent shear strength and waterproof properties. Test results are summarized below in Table III.

Table III

| Panel Assembly No. | Cure Temp., °C. | Cure Time, Minutes | Cure Pres., p.s.i. | Wood Failure, percent | Shear Strength,[1] p.s.i. Wet | Shear Strength,[1] p.s.i. Dry |
|---|---|---|---|---|---|---|
| 5 | 150 | 5 | ca. 175 | 85 | 374 | 293 |
| 6 | 150 | 10 | ca. 175 | 81 | 349 | 297 |

[1] The wet and dry shear strength tests were carried out in accordance with U.S. Department of Commerce Commercial Standard CS35–56.

Although certain preferred embodiments of the invention have been disclosed for purpose of illustration, it will be evident that various changes and modifications may be made therein without departing from the scope and spirit of the invention.

I claim:

1. In the method of bonding comprising forming an assembly of the materials to be bonded in which at least one surface in contact with an adjacent surface of the materials in said assembly is coated with a bonding composition, and heating the assembly at elevated temperatures for sufficient time to convert the bonding composition to the infusible state, the step which comprises employing therein a bonding composition containing (A) 40 to 70 parts by weight of a phenol and formaldehyde condensation product having an average molecular weight within the range of about 124 to 316; (B) 15 to 45 parts by weight free formaldehyde; (C) 20 to 65 parts by weight free phenol; and 10 to 160 parts by weight water, the ratio of free formaldehyde to free phenol being within the range of about 1.8 mols to 2.5 mols of free formaldehyde to free phenol, (D) 0.02 to 0.2 mol per mol of total phenol of activating agent selected from the group of sodium carbonate, potassium carbonate, and ethylenediamine, said composition having a pH within the range of about pH 8 to pH 11.5.

2. A non-resinous bonding composition capable of resinifying and curing in situ containing (A) 40 to 70 parts by weight of a phenol and formaldehyde condensation product having an average molecular weight within the range of about 124 to 316; (B) 15 to 45 parts by weight free formaldehyde; (C) 20 to 65 parts by weight free phenol; and 10 to 160 parts by weight water, the ratio of free formaldehyde to free phenol being within the range of about 1.8 mols to 2.5 mols of free formaldehyde to free phenol, (D) 0.02 to 0.2 mol per mol of total phenol of activating agent selected from the group of sodium carbonate, potassium carbonate, and ethylenediamine, said composition having a pH within the range of pH 8 to pH 115.

References Cited in the file of this patent

UNITED STATES PATENTS

| | | |
|---|---|---|
| 2,635,066 | Meiler et al. | Apr. 14, 1953 |
| 2,940,954 | Barr et al. | June 14, 1960 |